United States Patent Office 3,321,765
Patented May 23, 1967

3,321,765
SPHERICAL STEPPED-INDEX MICROWAVE LUNEBERG LENS
Basil Peters and Lawrence Brian Peters, Heston, England, assignors to Fairey Engineering Limited, Heston, England, a company of Great Britain
Filed Sept. 27, 1962, Ser. No. 226,696
Claims priority, application Great Britain, Oct. 3, 1961, 35,699/61; Dec. 15, 1961, 45,090/61
4 Claims. (Cl. 343—911)

This invention relates to spherical microwave lenses comprising a number of spherical or part-spherical shells nesting one within another, and having respective dielectric constants enabling incoming radio waves to be brought to a focus and reflected.

It has been proposed to construct spherical microwave lenses of a number of hollow part-spherical shells fitting one within another and each having a uniform dielectric constant approximately in accordance with the equation $K = 2 - r^2$ where K is the dielectric constant and $r$ is the normalized radius, i.e., the ratio of the actual radius of a point within the sphere to the overall radius of the sphere. In other words the dielectric constants of the shells are stepped.

With such lenses, it is difficult to achieve high efficiency of operation because incoming radio waves cannot be brought to a focus on the surface of the sphere.

According to one aspect of the present invention, the respective dielectric constants are approximately the theoretical values of dielectric constant which would be obtained for the lens dimensions and numbers of shells by the method of determining the dielectric constants described in this specification using the four charts A to D of the accompanying drawings.

Usually there will be no difficulty in manufacturing shells with dielectric constants exactly equal to the determined values, but the word "approximately" is used to include dielectric constants within 5% of the respective predetermined values.

According to another aspect of the invention, in a method of manufacturing a spherical microwave lens consisting of a number of hollow spherical or part-spherical shells fitting one within another, the dielectric constants of the respective shells are predetermined using the charts A to D in the manner described in this specification, the shells are manufactured to have dielectric constants approximately conforming with the values so determined and then the lens is assembled by fitting the shells together.

The constants are determined by first deriving a set of curves by obtaining four sets of points, one set from each of the charts A to D for the predetermined shell thickness ratio, and then determining the actual values for the predetermined centre sphere ratio from this set of curves in the manner described with reference to chart E.

The "shell thickness ratio" is the ratio of the common thickness of each shell to the diameter of the lens and the "centre sphere ratio" is the ratio of the diameter of the centre sphere of the lens to the total lens diameter.

The invention includes a lens made by the method defined above and includes in particular a lens, most of whose dielectric constants are within 5% of the values so determined.

The invention may be carried into practice in various ways and one example of a method of determining the dielectric constants of the shells and the details of certain specific lenses will be described by way of example with reference to the accompanying drawings, in which.

In order to know what values of dielectric constant are required for a spherical microwave lens consisting of a central sphere and successive hollow spherical shells surrounding it, the four sets of curves Charts A to D, have been derived. It is believed that the use of the curves can best be illustrated by means of a specific example.

It is assumed that a 10.5" diameter reflector lens is required, and it may be stated here that normally the only requirement of the customer is the diameter of the lens based on the echoing area required. The larger the lens, the more effective it is as the echoing area increases with the square of diameter.

It is usual to have a set of standard moulds for making the centre sphere and the various shells so that there is only a limited choice of centre sphere diameter and of shell thickness, and a convenient centre sphere radius and shell thickness is decided upon in accordance with the sizes available.

In the specific example being considered, it is decided to have a centre sphere diameter of 2.5" and eight shells of 0.5" thickness each, to make up the 10.5" total diameter. Thus nine values of dielectric constant are required, one for the centre sphere and eight for the various shells.

The shell thickness ratio is 0.5/10.5 or 0.0476 and the centre sphere ratio is 2.5/10.5 or 0.238.

Using Chart A, a line parallel with the dielectric constant ordinate is drawn corresponding to the calculated shell thickness ratio 0.0476. This can be seen to intersect eleven of the curves on Chart A including the curves for the inner shell and the centre sphere marked respectively C–1 and C. The first seven and the last two of the dielectric constant values as indicated are used to provide nine points in a line parallel with the dielectric constant ordinate on the graph of FIGURE 5 opposite an abscissa value of 0.1 centre sphere ratio.

Figure 1:
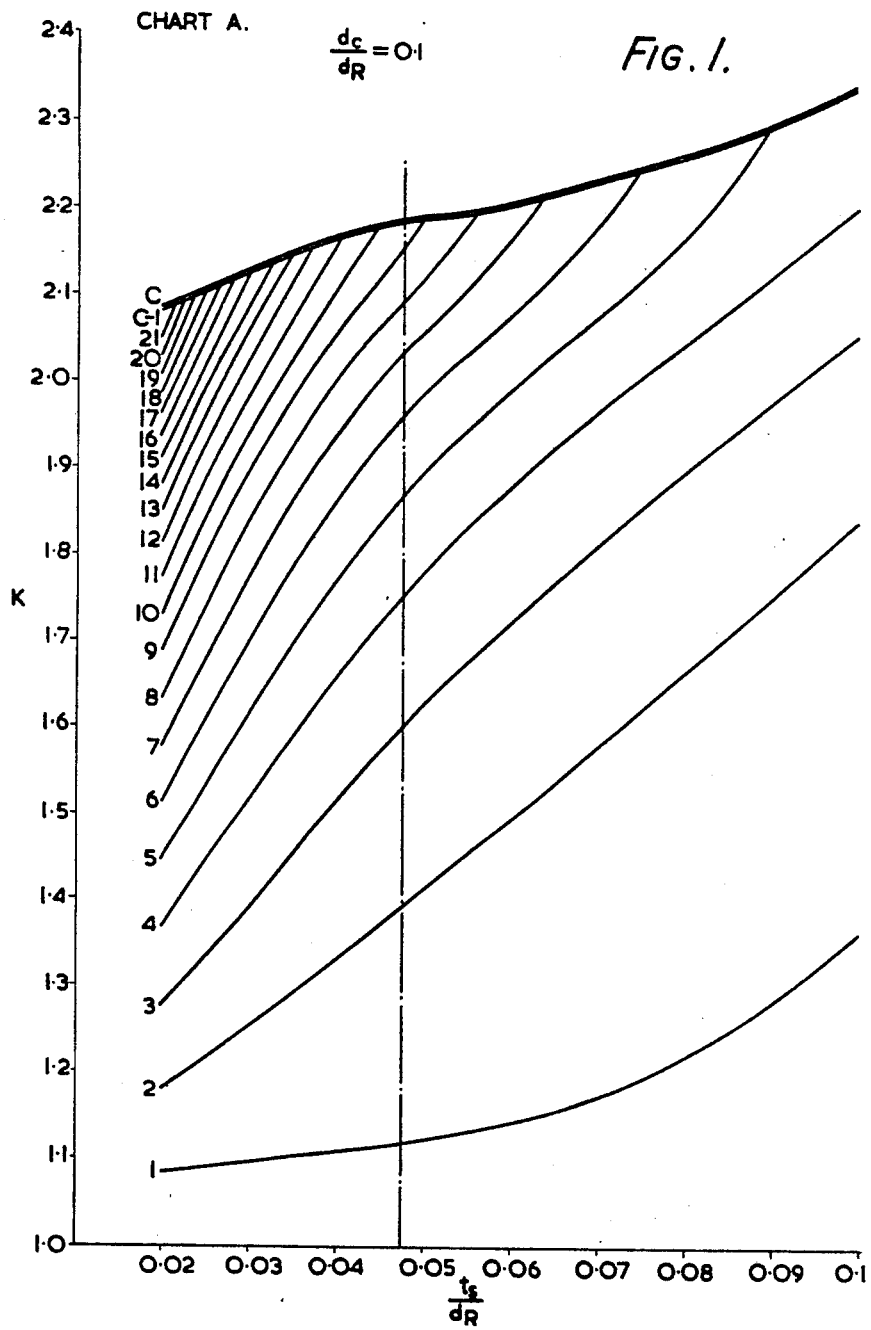
FIGURE 1 (Chart A) is a set of curves indicating dielectric constants for successive shells and for the centre sphere of a spherical microwave lens with a centre sphere ratio of 0.1 and for various shell thickness ratios from 0.02 to 0.1.
Figure 2:
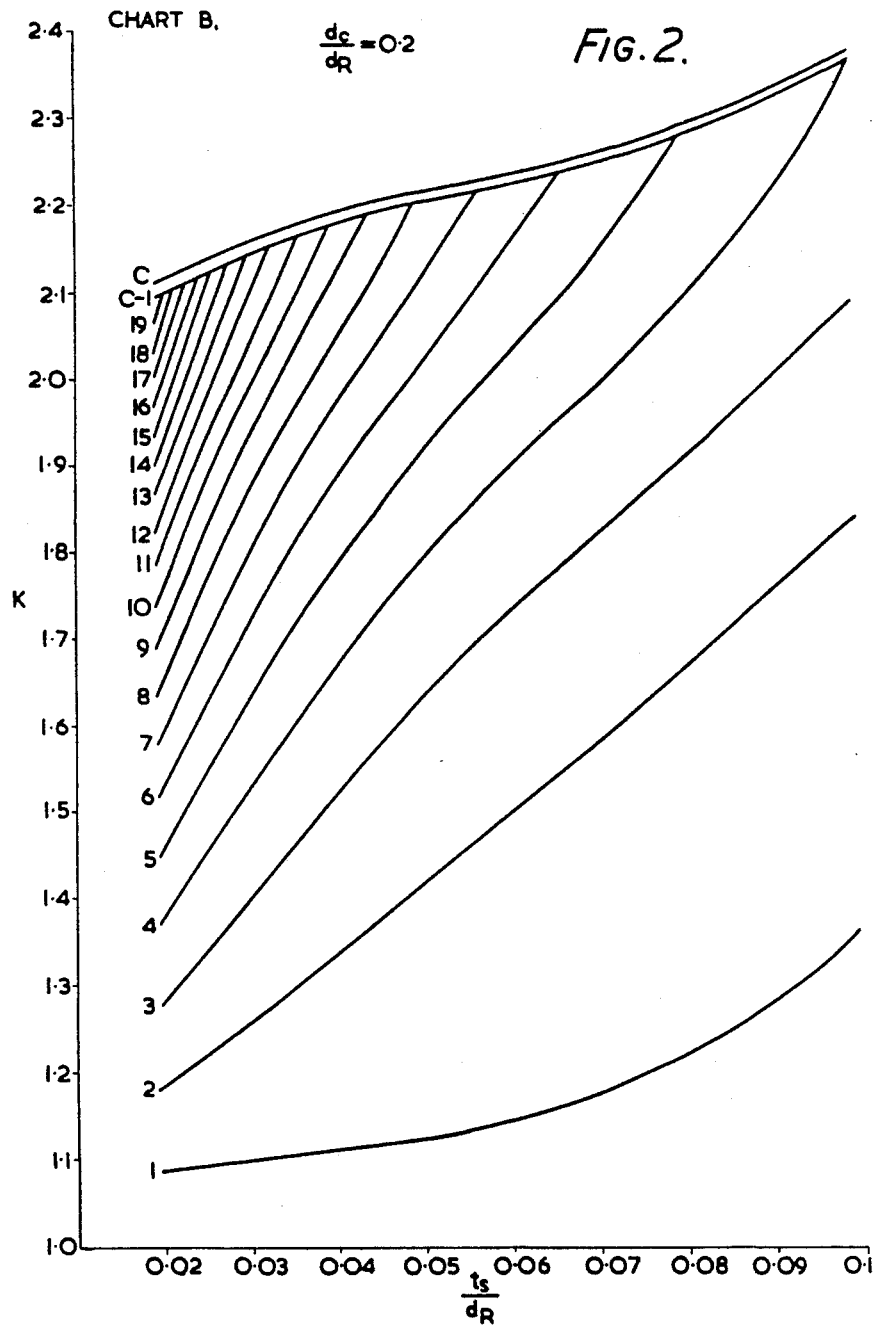
FIGURES 2, 3 and 4 (Charts B, C, and D) are similar sets of curves for respective centre sphere ratios of 0.2, 0.3 and 0.4.
Figure 3:
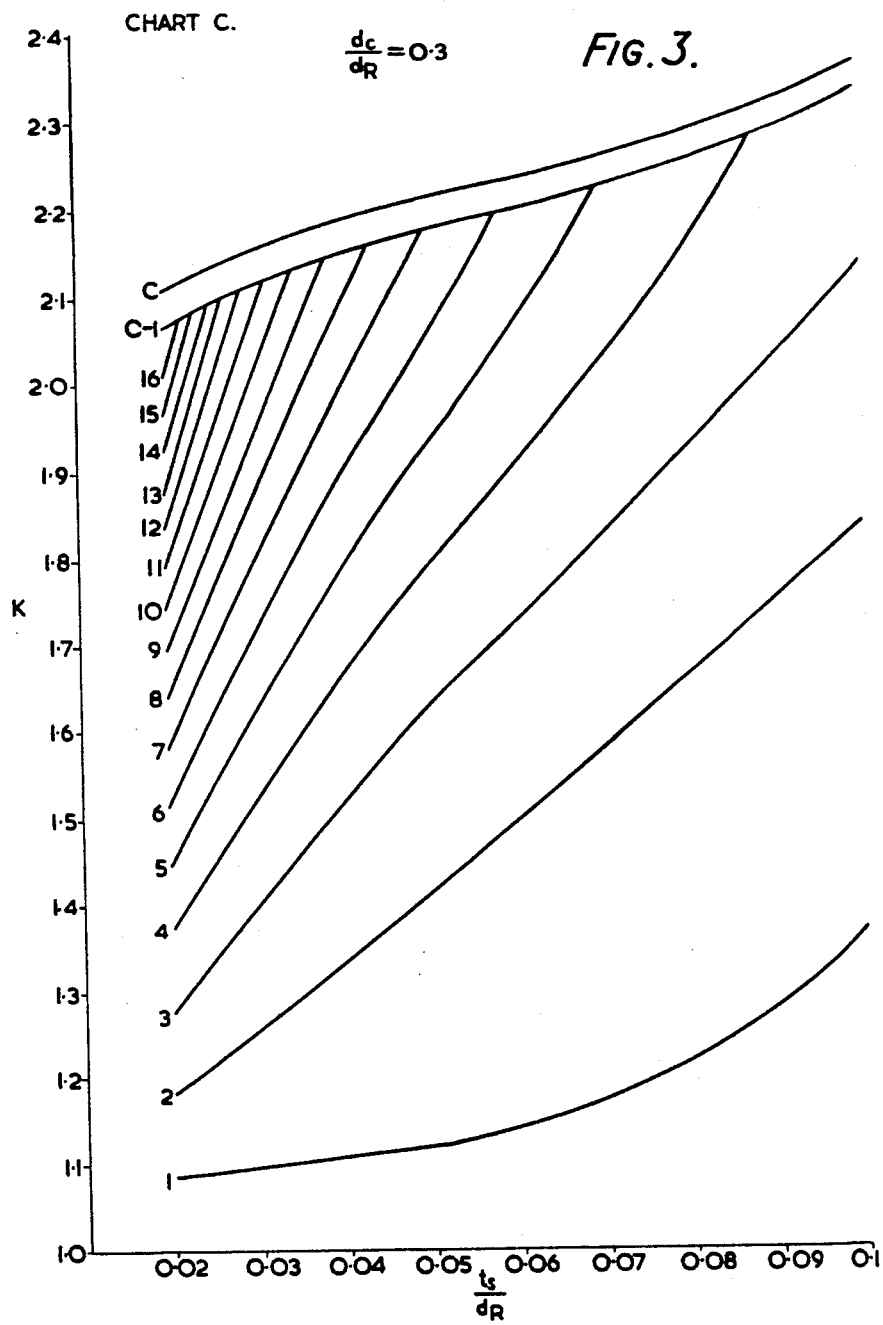
Figure 4:
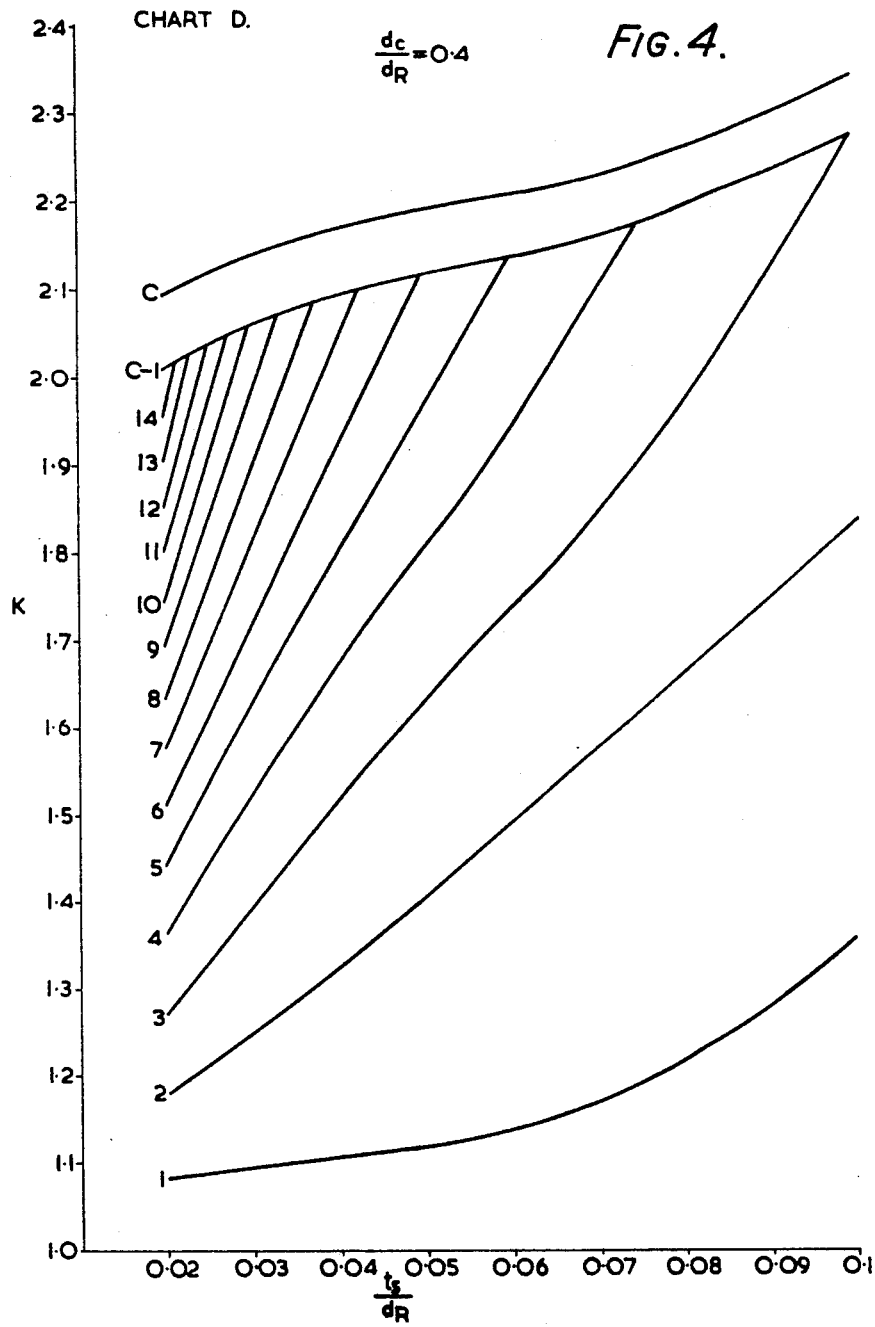
Figure 5:
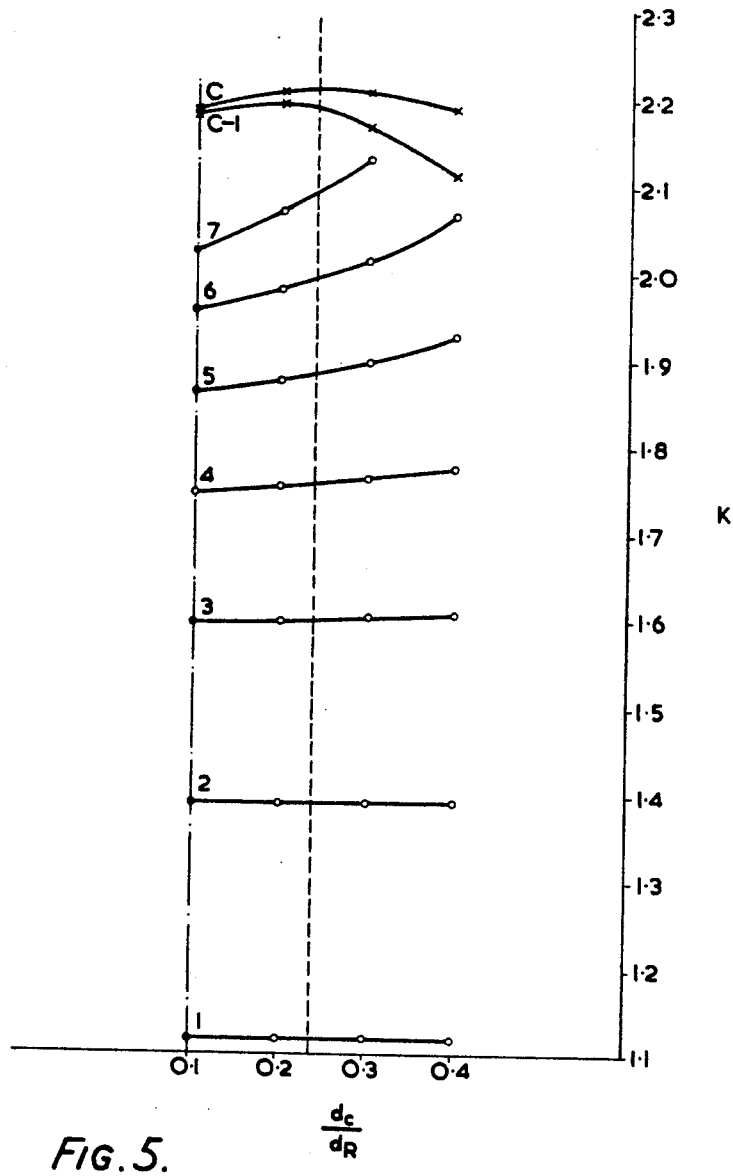
FIGURE 5 is a set of curves derived from FIGURES 1 to 4 by a method to be described below.
Figure 6:
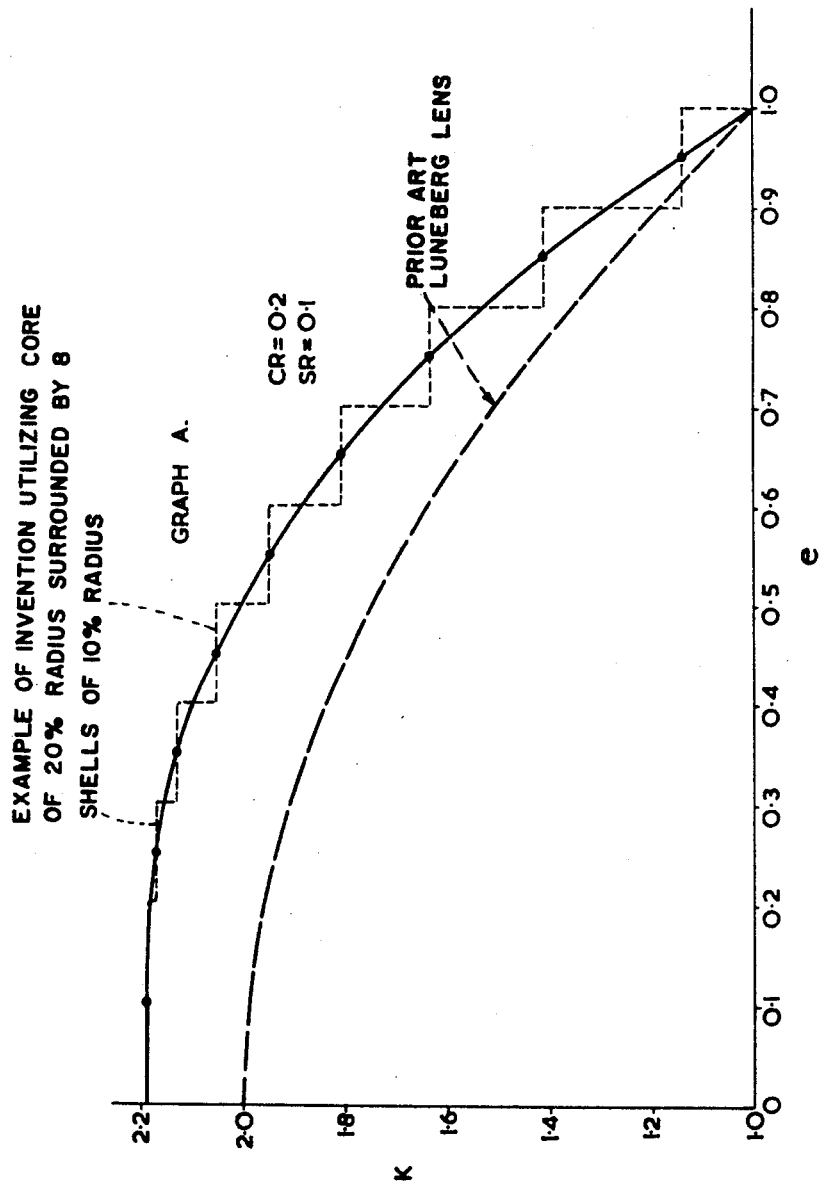
FIGURES 6 through 10 are graphs showing dielectric constants related to five specific lenses.
Figure 7:
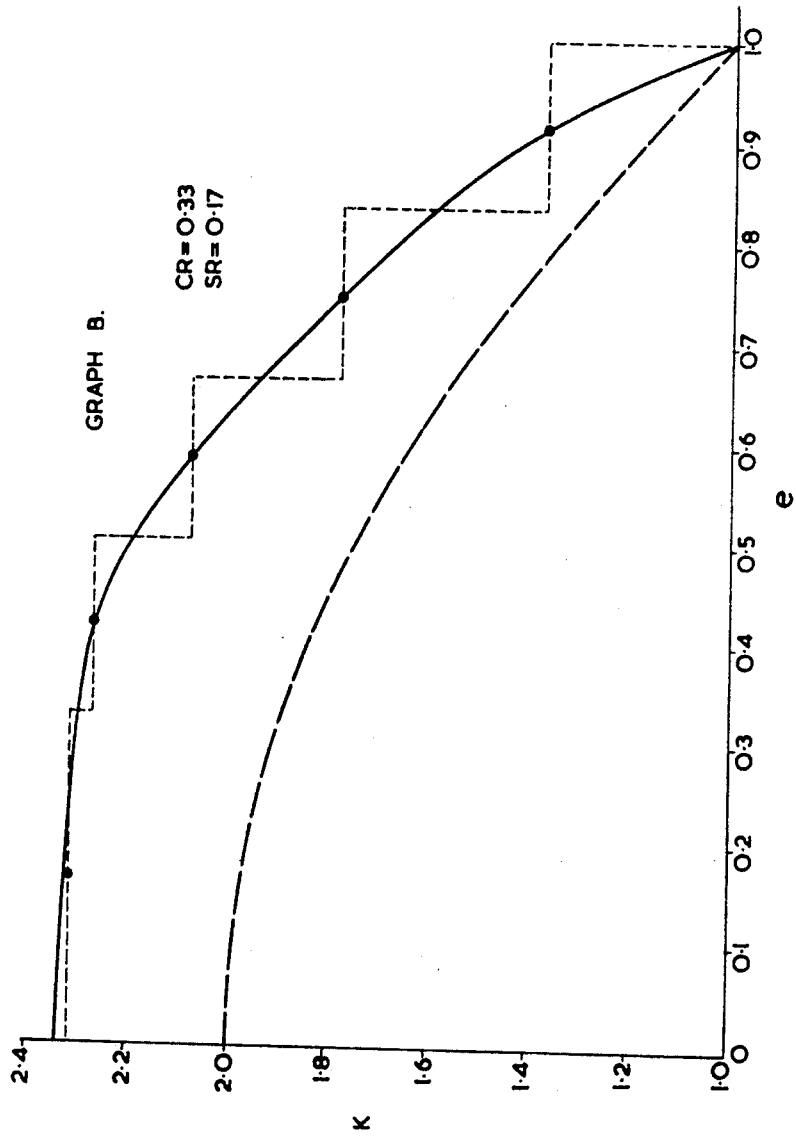
Figure 8:
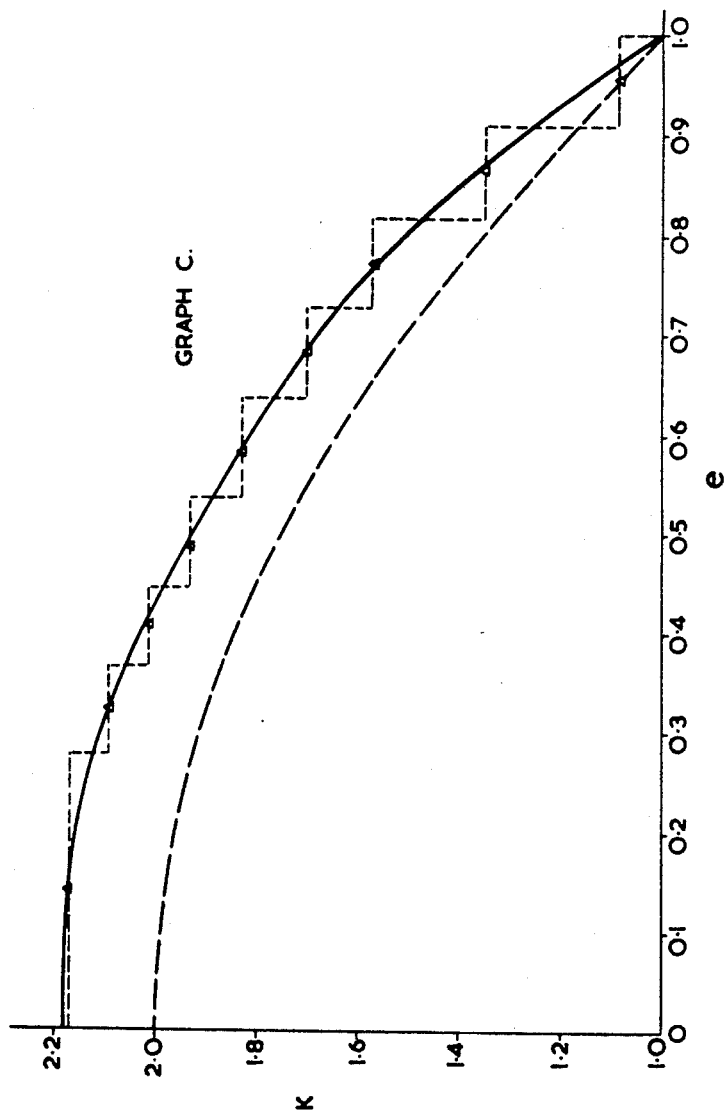
Figure 9:
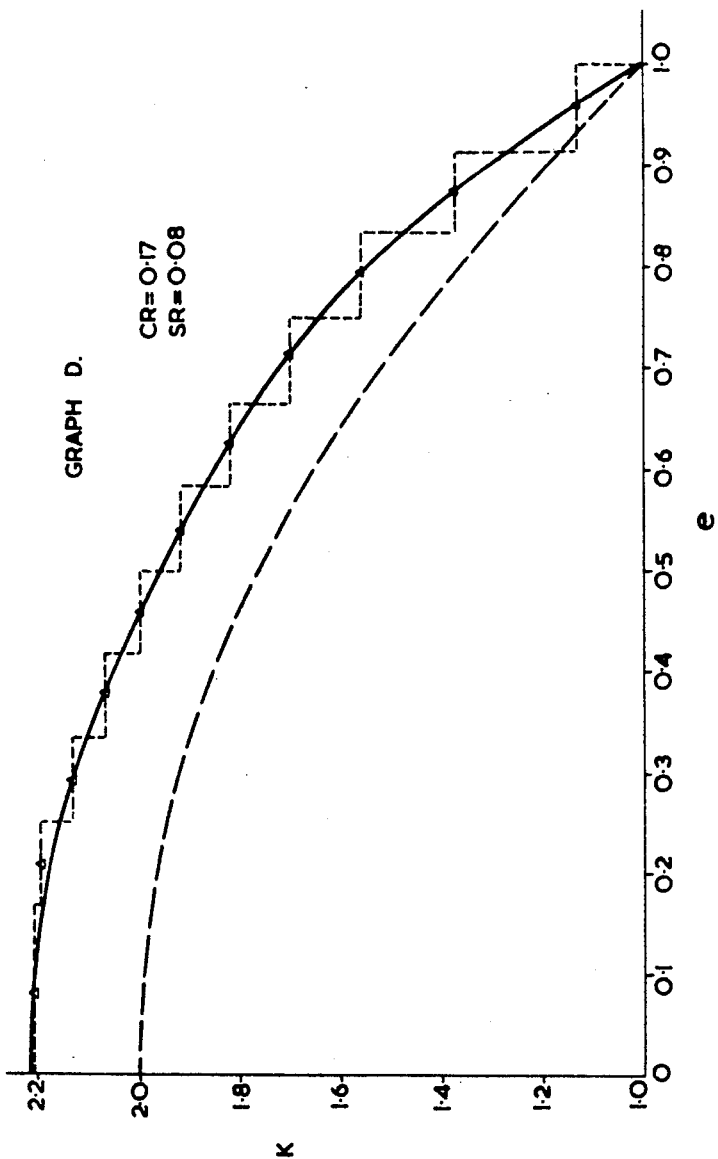
Figure 10:
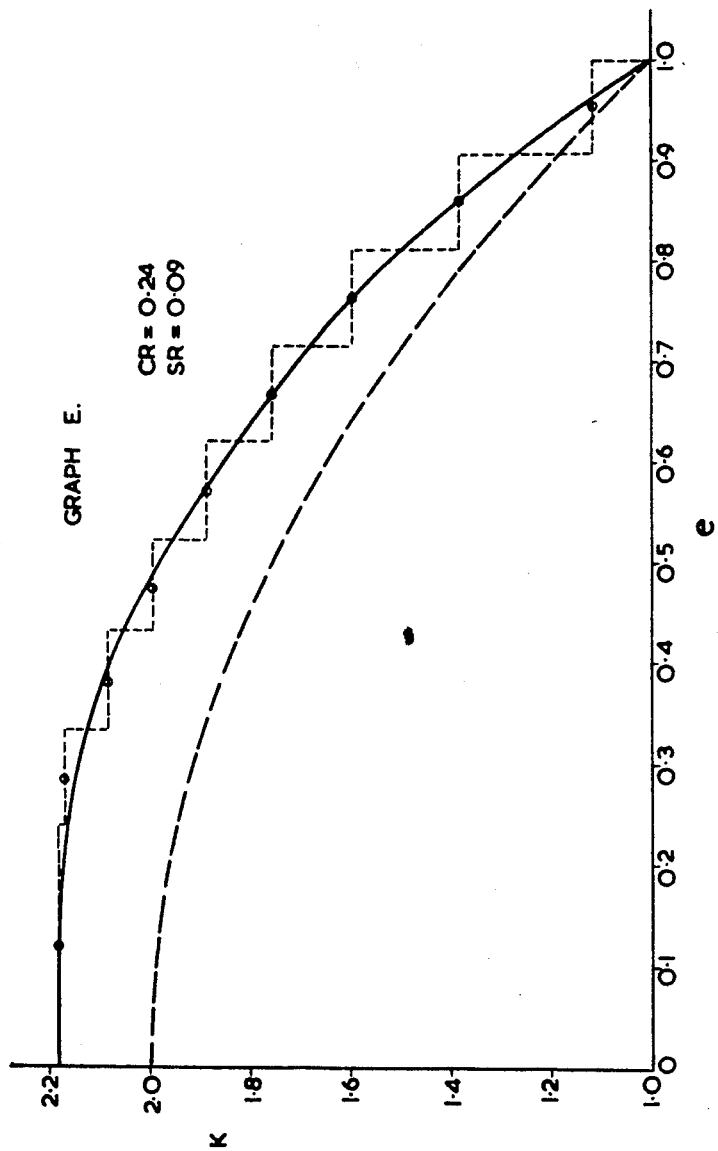

In a similar manner using Charts B, C, and D, three further sets of points are provided for FIGURE 5 corresponding to centre sphere ratios respectively of 0.2, 0.3 and 0.4. It will be noticed that only eight values can be obtained from Chart D for the given shell thickness ratio, so that only eight points are obtained on the fourth line in FIGURE 5.

As shown, for example, the first, second, third, and so on, sets of points respectively on these four lines are joined to provide nine curves which deviate to a greater or lesser extent from the horizontal.

It will be remembered that the desired centre sphere ratio is 0.238, and if the dotted line parallel with the dielectric constant ordinate is drawn at this centre sphere ratio value to intersect the nine curves, a set of nine dielectric constant values will be obtained which are respectively 1.118 for the outermost shell,
1.391 for the 7th shell,
1.597 for the 6th shell,
1.756 for the 5th shell,
1.883 for the 4th shell,
1.989 for the 3rd shell,
2.091 for the 2nd shell,
2.189 for the innermost shell,
2.211 for the centre sphere.

These are the dielectric constants for the desired lens.

It will be noticed that although there are only three points on the curve in FIGURE 5 for the seventh shell, dotted line intersects the curve obtained from these three points, so that no difficulty is encountered in determining the dielectric constant for this shell. If, in any case, the line does not intersect any of the curves, they must be extrapolated using the preceding curves as a guide.

It is considered that usually it will be sufficient to give a fairly efficient lens for the dielectric constants to be within 5% of the values determined according to this method.

The invention includes certain specific lenses whose dielectric constants were individually calculated, and are shown in five graphs of FIGURES 6 through 10. Each of the graphs relates the dielectric constants of the materials of the various shells to a curve which is substantially displaced from the theoretical curve corresponding to the equation $K=2-r^2$ and it has been found that lenses made in accordance with these curves can in fact not only bring incoming plane waves to a focus substantially at the surface of the sphere, but a source of radiation at the surface will produce a plane transmitted wave.

However, the dielectric constants have to be calculated separately for each individual lens and the five graphs A to E in the accompanying drawings disclose the particular constants determined for five specific lenses.

Graph A was calculated for a 10″ diameter lens having a 2″ diameter centre sphere and eight shells each of ½″ thickness. The centre ratio (that is to say, the ratio of the diameter of the centre sphere to the diameter of the lens) is .2 and the shell ratio is .1. The dielectric constants for the various shells can be determined by the ordinate steps shown in dashed lines on the graph.

The lens according to Graph B is a 6″ diameter lens with a 2″ diameter centre sphere and four shells of ½″ thickness each.

Graph C shows the dielectric constants for an 11″ diameter lens with a 2″ diameter centre and nine shells of ½″ diameter each.

Graph D shows the dielectric constants for a 12″ diameter lens with a 2″ diameter centre and 10 shells of ½″ diameter each.

Finally, Graph E shows the dielectric constants for a 10½″ diameter lens with a 2½″ diameter centre and eight ½″ thick shells.

It is of interest to note that the five graphs A to E give dielectric constants to accord with those given by Charts A–D within the 5% tolerance, and that indeed two of the curves agree very closely with the values obtained from the charts.

Greater divergence was obtained in the case of the specific example of Graph B in which there are only four shells, but even so, the values obtained are within 5% of the values which would have been obtained using the Charts A–D.

Each shell is moulded from expanded thermoplastic material whereof the dielectric constant is determined by the degree of expansion, the material being preheated to expand it before it is placed in the mould for the moulding operation. The material for each shell may in fact be pre-expanded approximately to its final dielectric constant before being placed in the mould. A suitable material is polystyrene.

In order to ensure satisfactory accuracy it is of course essential that the dielectric constant of each shell shall be uniform throughout all parts of the shell. If the material is placed in the mould before being expanded or foamed it will initially occupy only a part of the mould cavity and will normally descend by gravity to the lowest part. Then, when foaming or expansion takes place, the material in the lowest part of the mould will have to force the material above it upwards into the upper part of the mould against the friction of the sides of the mould. Bearing in mind that the shape of the mould is in most cases a relatively thin hollow hemisphere, the resistance to such shifting is liable to be sufficient to cause the material to be substantially denser in one part than in another. By expanding the material before it is placed in the mould, it initially occupies the whole of the space and hence does not have to shift bodily after being initially charged into the mould.

The use of shells of standard thickness not only makes it possible to employ the same mould for lenses of a number of different sizes, but also makes it possible to avoid the need for a shell which is either so thick that it is difficult in a reasonable time to enable the heat to penetrate through its thickness, or, on the other hand, that is so thin that it is difficult to charge the mould uniformly with the thermo-plastic material.

The invention is applied to the production of a radar reflector comprising a microwave lens designed to focus a plane wave at a point on the surface of the spherical lens, together with a part-spherical metallic reflector applied to a portion of the surface of the lens. Such a reflector has the same property as a corner reflector (comprising three plane reflectors in mutually perpendicular planes) namely that it will reflect the wave back in the direction from which it came, but has advantages over the corner reflector in its higher efficiency of reflection and constancy of reflection as the direction of the wave deviates from a certain central axis.

The lens is a dielectric sphere built up from a solid spherical core and a number of hollow hemispherical shells fitted one within the other in pairs with the core in the innermost pair of shells. The dielectric constants of the shells fall off progressively outwards approximately in accordance with the graphs referred to.

Thermo-plastic materials such as polystyrene may be employed provided that their electrical losses are not excessive. For example polyethylene or polyvinylchloride may be employed or even expanded glass. In general rubber and many other plastic materials would have an excessive electrical loss.

To obtain the dielectric constant required in the central spherical core and certain innermost shells without compressing the material, the polystyrene is loaded with a material such as titanium dioxide.

Thus in one specific example the following ingredients are employed:

| | Parts |
|---|---|
| Styrene monomer | 670 |
| Styrene polymer | 373 |
| Benzoyl peroxide | 11½ |
| Titanium dioxide | 455 |
| Water | 16 |
| Petroleum ether | 97 |

The polystyrene is mixed with the styrene monomer in a suitable mixing vessel until a clear viscous solution results. The titanium dioxide is added slowly to ensure that it is sufficiently dispersed throughout the mixture, followed by the addition of the rest of the ingredients. The mixture is placed in sealed vessels and heated to 47° C. for a period of 5 days, followed by a heating period of 24 hours at 67° C. The polymerised billets are removed from their containers and ground to a suitable size.

Such granules are ground in a high speed mill to produce particles of such a size that the majority fall between ten and twenty mesh sieves (British Standard sizes) the granules are then sieved into narrower ranges for example 10 to 14 mesh, 14 to 16 mesh, 16 to 18 mesh. Larger particles than 10 mesh and smaller than 18 mesh are discarded. The range of particle sizes to be used depends upon the size of the particular shell to be made. For a high density inner shell the larger particles are employed since the expansion required is small, whereas for a low density outer shell the smaller particles are used since after expansion such particles will still be small enough to permit uniform loading of the moulds.

The polystyrene employed contains certain volatile solvents (for example butane) which when heated to near the melting point of the polystyrene (which is about 85° C.) evaporate and expand forming a micro-cellular or foamed structure which reduces the mean density of the material.

The appropriate granules are then pre-expanded in a pre-expanding equipment, in which the granules are circulated by a stream of hot air whose temperature is controlled at the lowest temperature (of the order of 120° C.) required to give even expansion, the precise value depending upon the quantity of material to be expanded. The rate of air flow is adjusted to maintain circulation of the granules, and the time required will depend upon the degree of pre-expansion and may be from 10 to 45 minutes. The air stream used in the pre-expansion process is ionised by an electric arc discharge prior to passing through the polystyrene granules in order to prevent the build-up of static electricity, to reduce adherance of the granules one to another, and enable an even flow and therefore even expansion to be obtained.

In order to obtain improved uniformity, especially for the shells of lower density, the particles may be sieved after expansion, the particles of each size thus obtained being expanded again if necessary for that shell, ore employed for a shell of the next lower density.

The required bulk density can be approximately measured in the pre-expander by viewing through a graduated window and then checked more accurately in a measuring cylinder.

The calculated weight of granules is then charged into a mould.

The mould comprises a hemispherical outer cavity and a hemispherical plug whose diameter is ¼″ less than that of the cavity. The plug is carried by a stout diametrical cross bar which fits over the top of the cavity and is accurately located by means of dowels. The space on either side of the cross bar is closed by sector shaped half lids, over which a cover is securely clamped in place.

To charge the mould a portion of the granules is placed in the bottom of the open cavity and the plug is eased down on to them whilst being moved to and fro so as to distribute them away from the centre. The remainder of the granules are poured into the narrow mould space without agitation and are carefully pushed under the cross bar to fill the mould chamber completely. An ionised air stream may also be employed during the mould loading procedure to prevent poor loading due to build-up of static electricity.

If there is a discrepancy between the weighed quantity of granules and the quantity required to fill the mould chamber, some of the smaller or larger particles may be removed by sieving and the weight made up with larger or smaller particles.

The moulds are then clamped up and immersed in boiling water, after which they are rapidly cooled by immersion in cold water. In the case of the centre sphere the immersion in boiling water may last 1½ to 2 hours, in the case of shells of unloaded polystyrene the immersion may take ½ hour, whereas in the case of polystyrene loaded with titanium dioxide the immersion may be for 10 minutes followed by cooling and then a further immersion for 10 minutes.

After cooling the shells are removed and dried in an oven for 24 hours at least, at a temperature not more than 50° C.

The shells and core are then assembled together with the joints of the pairs of shells staggered relatively to one another. A thin protective coating, for example of fiberglass, may be applied to the outer surface.

The spherical microwave lens so formed is provided with a reflecting cap of part-spherical shape made of thin aluminum foil hammered to shape to fit the surface of the lens. Alternatively, the reflector may be formed by spraying with aluminum or painting on to the surface of the lens or on to its fiberglass skin.

What we claim as our invention and desire to secure by Letters Patent is:

1. A spherical microwave lens which will bring incoming waves to a focus on the surface of the sphere comprising in combination, a number of hollow spherical shells fitting within one another with the successive shells having a desired centre sphere ratio in the range 0.1 to 0.4 and shell thickness ratios in the range from 0.02 to 0.1, and each shell with a dielectric constant designated from the corresponding ones of curves 1 through 7 in FIGURE 5 at a specified center sphere ratio within said range.

2. A lens as defined in claim 1 with the dielectric constants of the shells displaced from the curve corresponding to the equation $K=2-r^2$ to the extent illustrated by FIGURES 6 through 10.

3. A lens as defined in claim 2 wherein the shell thickness ratio is equal for all shells.

4. A lens as defined in claim 1 wherein the lens has a centre sphere and the sphere and shells are of styrene material containing titanium dioxide expanded under pressure for each shell and the centre sphere to the degree giving its designated dielectric constant.

References Cited by the Examiner
UNITED STATES PATENTS 2,849,713  8/1958  Robinson _____ 343—911 L
2,943,358  7/1960  Hutchins et al. ____ 343—911 L

OTHER REFERENCES

Gurman: Modified Luneberg Lens, Journal of Applied Physics, pp. 855–859, vol. 25, No. 7, July 1954 (copy in Scientific Library) 343–911 L.

Peeler et al.: Microwave Stepped-Index Luneberg Lenses, Naval Research Laboratory Report 4843, Oct. 26, 1956 (copy in Group 250) 343–911 L.

Morgan: General Solution of the Luneberg Lense Problem, Journal of Applied Physics, pp. 1358–1368, vol. 29, No. 9, September 1958, (copy Sci. Lib.) 343–911 L.

ELI LIBERMAN, *Primary Examiner.*

HERMAN KARL SAALBACH, *Examiner.*

R. F. HUNT, *Assistant Examiner.*